May 6, 1969     W. W. GARSTANG ET AL     3,443,251
DISCOIDAL FEED-THROUGH CAPACITORS
Filed Dec. 23, 1965
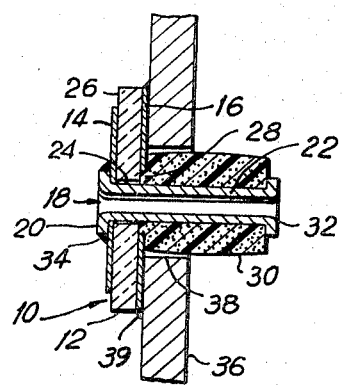
FIG. 1
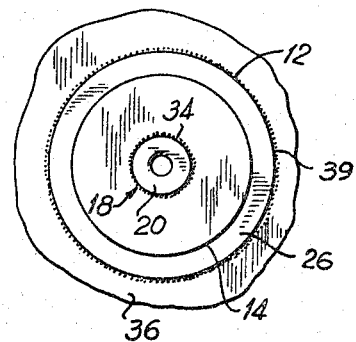
FIG. 2
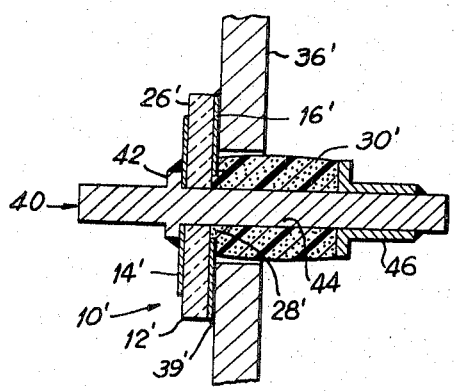
FIG. 3
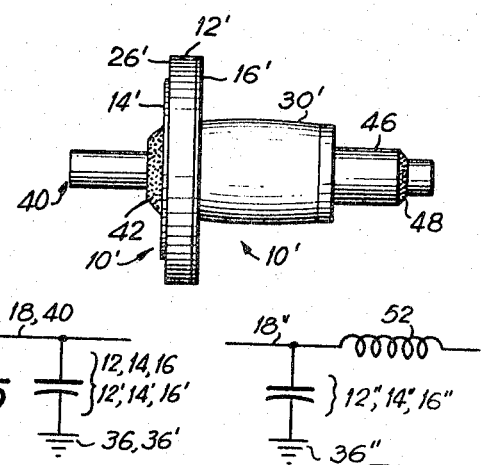
FIG. 4
FIG. 5
FIG. 7
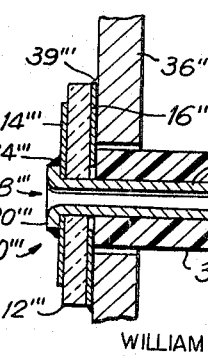
FIG. 6
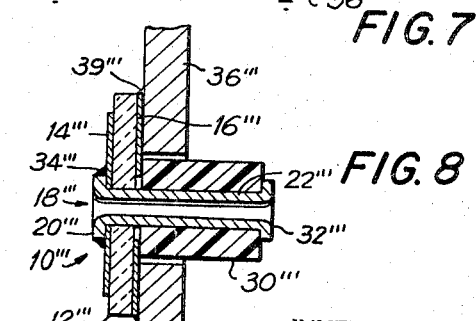
FIG. 8
INVENTORS
WILLIAM W. GARSTANG
LAWRENCE E. NORDQUIST
BY
*Richard M. Rabin*
ATTORNEY — # United States Patent Office 3,443,251
Patented May 6, 1969

3,443,251
DISCOIDAL FEED-THROUGH CAPACITORS
William W. Garstang, Milwaukee, Wis., and Lawrence E. Nordquist, North Dartmouth, Mass., assignors to Cornell-Dubilier Electric Corporation, a corporation of Delaware
Filed Dec. 23, 1965, Ser. No. 526,649
Int. Cl. H01g 1/035, 3/06
U.S. Cl. 333—79   9 Claims This invention relates to capacitors for use in apparatus having portions operating at very and ultra high frequencies and also for use in D.C. equipments and to the methods of manufacturing such capacitors. These capacitors are particularly suitable for use as feed-through elements, i.e., for passing relatively low frequency electrical currents via a lead or conductor through an opening in a conducting wall, screen, or the like while presenting a low impedance shunt path to the wall for currents of very and ultra high frequencies.

Feed-through capacitors are employed in large numbers to provide a low impedance path for high frequency current to ground at shielding enclosures as in television tuners and the like. A construction commonly employed heretofore included a ceramic capacitor element contained within and connected to a metallic enclosure wherein the enclosure was connected to the shielding wall. One electrode of the capacitor, which was insulated from the capacitor enclosure, was connected to the conductor which was to be passed through the wall. The other electrode was connected to the capacitor enclosure and, through the conductive enclosure, to the wall. Heretofore such capacitors were complex, expensive and difficult to assemble and install and were subject to failure due to unsoldering of the case and the like when being installed. It is an object of this invention to provide a feed-through capacitor which is simple in structure, efficient in operation, and which is easily and quickly mounted upon a chassis or other metallic support.

Briefly, feed-through capacitors fabricated according to this invention include a member of high-dielectric ceramic material such as alkaline earth titanates, having an electrode that is adapted to be soldered directly to the conducting panel on which the capacitor is mounted. Where such direct solder connection was attempted previously a high rate of unit failure was encountered due to the temperature differential created within the capacitor structure and due to the difference in the coefficients of expansions of the constituent members of the capacitor. An important object of the invention is to provide a feed-through capacitor capable of being directly soldered to a conductive wall without destroying or degrading the capacitor.

It is a further object of this invention to provide a compact highly efficient filter which incorporates the aforementioned feed-through capacitor structure with its noted advantages together with a closed flux path to increase the high frequency impedance of the central conductor relative to shunt impedance path provided by the ceramic capacitor element.

A further object of the invention is to provide a feed-through capacitor having a self-contained means which is effective to locate the capacitor for connection to a conductive panel and to insulate the capacitor lead element from the panel.

Yet another object of this invention is the provision of a particularly advantageous and novel method for assembling feed-through capacitors.

A further object of this invention is to provide a novel feed-through capacitor structure which may be assembled rapidly and with minimized rejection of assembled units due to fractured capacitor elements.

In one aspect of the invention there is provided a feed-through capacitor having a high dielectric constant ceramic body which has conductive electrodes or coatings on the opposed surfaces thereof. An aperture is provided through the ceramic body in which the conductive feed-through lead is positioned. A first electrode terminates at the edge of the aperture where it is connected to a shoulder or flange on the central conductor which is larger than the aperture in the body. A second electrode terminates at a point short of the central aperture and is effectively isolated from the central conductor. Insulator means is positioned about the central conductor in firm engagement with the second electrode surface. The insulator locates the capacitor with respect to the mounting hole and further it maintains a desired stress loading on the capacitor body.

In another aspect of the invention a flux path about the central conductor is provided by a rigid ferrite member which is insulated from the central conductor. The ferrite body is connected to the second electrode layer. The ferrite material has physical properties similar to those of the high dielectric ceramic body, i.e., they are both relatively hard and brittle. Resilient means is provided for maintaining the parts of the feed-through filter in operative relation while expansion and contraction of the filter elements occur during installation and use.

In a further aspect of the invention a novel method of assembling feed-through capacitors is provided. The elements are stacked on the central conductor which is then manipulated to secure them together. Subsequently portions of the assembly are subjected to a soldering operation to insure good electrical connection therebetween.

The above and other objects of the invention will become apparent from the following description taken in conjunction with the accompanying drawings. In those drawings:

FIG. 1 is a sectional view of a capacitor fabricated according to the teachings of the invention as mounted on a metal panel;

FIG. 2 is a view of the capacitor of FIG. 1 as viewed in the direction of the arrow 2 of FIG. 1 with the panel omitted;

FIG. 3 is a sectional view of another embodiment of the novel capacitor mounted on a conductive panel;

FIG. 4 is a side view of the capacitor of FIG. 3;

FIG. 5 is a diagrammatic representation of the circuit of the capacitor of FIGS. 1 and 3;

FIG. 6 is a sectional view of a filter fabricated according to the teachings of the invention;

FIG. 7 is a diagrammatic representation of the circuit of the filter of FIG. 6; and FIG. 8 is a sectional view, similar to FIGS. 1 and 3, of yet another embodiment of the invention.

Referring to FIGS. 1 and 2 the feed through capacitor 10 includes a discoidal body 12 of high dielectric ceramic material to which a pair of opposed electrodes 14, 16, of silver, have been applied by well-known techniques. The dielectric body 12 is preferably of formed of a mixture of the alkaline earth titanates. These compositions exhibit large dielectric constants and are well known and therefore are not herein described in detail. A central conductor 18 in the form of an eyelet, of conductive material such as brass, which has a flange 20 and a shank 22 is positioned in the central aperture 24 of disc 12. The aperture 24 is slightly larger than the diameter of the eyelet shank to allow some relative movement therebetween. For convenience of description the electrode 14 which is toward the flange 20 is designated as the outer electrode. Outer electrode 14 extends outwardly from the edge of aperture 24 along the surface of the ceramic body and terminates at a point short of the periphery of the disc leaving a margined area 26. The inner electrode 16 which confronts the outer electrode 14 extends from the peripheral edge of the disc inwardly toward the central aperture 24 and terminates a short distance therefrom leaving a margined area 28. Margined area 26 and the uncoated peripheral edge of the disc isolate the outer electrode 14 from the inner electrode 16. Margined area 28 isolates the inner electrode 16 from the central conductor 18. Insulator means 30, which in one embodiment of the invention is fabricated from silicone rubber in the form of a "bead," surrounds the shank 22 of the eyelet and is in firm pressure engagement with the capacitor body 12. Insulator means 30 is maintained in its stressed condition by a secondary flange 32 formed at the end of the eyelet opposite flange 20 by rolling over a portion of the eyelet shank 22. A layer of solder 34 electrically and mechanically unites the eyelet flange 20 and the outer electrode 14.

The feed-through capacitor heretofore described is adapted to be directly mounted on a conductive panel 36. The capacitor is located in a mounting aperture 38 in panel 36 by the insulator 30 before the capacitor is secured to the panel. Once located the capacitor is fixed in place and electrically connected by application of solder 39 between the electrode 16 and the metal panel 36. Conveniently, the solder is applied as a ring-shaped preform with a flux core or the flux can be brushed on in a separate operation. Application of heat causes the solder to flow and wet both the electrode 16 and the adjoining panel surface. A particular advantage of the described embodiment becomes evident during the soldering operation in that the resilient bead 30 keeps the disc 12 against the eyelet flange 20, preserving the circuit continuity, and also compensates for the differing thermal coefficients of expansion of the various parts. The end flanges 20 and 32 of the eyelet provide convenient soldering points for connecting the feed-through capacitor in the operative circuit that is extended through the wall 36.

Referring now to FIGS. 3 and 4, wherein like parts are provided with reference numerals primed, the capacitor 10' includes a disc like body 12' of high dielectric ceramic material which is provided with opposed electrodes 14', 16'. However, the capacitor differs from the embodiment of FIG. 1 in that a solid feed-through conductor in the form of a pin 40 is provided. The inner and outer electrodes 14', 16' are margined at 26' and 28' to effectively isolate the central conductor 40. Conductor 40 has a shoulder 42 that engages the outer electrode 14'. Insulator-locator means 30' is positioned about the "shank" 44 of the central conductor 40 and is maintained against the capacitor body 12' by an eyelet 46 which is secured as by a weld 48 to the conductor 40. Shoulder 42 is soldered to the outer electrode 14' after the capacitor is assembled. The capacitor 10' may be assembled to a metal panel 36' by soldering as described in connection with the embodiment of FIG. 1.

In FIG. 5 there is provided a diagrammatic representation of the electrical circuit of the capacitors of FIGS. 1 and 3. It will be seen that the central conductor, eyelet 18 or pin 40, provides a low impedance path for the passage of low frequency or direct currents and the capacitor body 12, 12' provides a low impedance shunt path to the conductive shielding panel 36, 36' which may be at ground potential.

Referring to FIG. 6 the aforedescribed feed-through capacitors may be incorporated in a low-pass filter. The filter 50 includes a ferrite slug 52 which is positioned about a central conductor 18" similar to the eyelet 18 of FIG. 1. High core loss ferrite materials having suitable properties for this application are well known and therefore are not herein described in detail. Such ferrites and the alkaline earth titanate ceramic capacitor body have similar physical properties in that they are both relatively hard and brittle therefore requiring special care in handling and in use to prevent the development of deleterious stresses which might cause fractures thereof. The capacitor portion 10" includes a high dielectric body 12" to which are applied outer 14" and inner 16" electrodes. An eyelet 18", having a flange 20" and a shank 22", is secured to the dielectric body. A sleeve 54 of insulation, such as Teflon, is positioned about the shank 22" of the eyelet, which sleeve insulates the ferrite 52 from the central conductor. When in position the ferrite core 52 is in engagement with the inner electrode 16", hence in contact with the metal panel 36". The ferrite core is maintained against the inner electrode 16" by a resilient insulating washer 56 of silicone rubber. Silicone rubber washer 56 is placed in compression by the formation of the secondary eyelet flange 32". Ferrite core 52 increases the impedance of the central conductor 18" to the flow of very or ultra high frequency currents therealong thus making the shunt path provided by the capacitor 10" that much more attractive (FIG. 7). As illustrated in FIG. 6 the ferrite slug 52 locates the filter 50 in the mounting hole provided in the panel to which the filter is connected.

Referring to FIG. 8 the construction therein illustrated is similar to that shown in FIG. 1, however, the insulator means 30''' is fabricated from a thermosetting resin such as phenolic. The insulator 30''' locates the capacitor 10''' in the panel 36''' and prevents contact between the eyelet 18''' and the panel.

The method of assembling feed-through capacitors described herebelow deals with the "eyelet" form, however, its applicability to the other embodiments described alone will be readily understood by those skilled in the art. The method includes the step of positioning an eyelet 18 with the flange 20 against an appropriate die stop (not shown). Next, the ceramic body 12 on which the margined electrodes 14, 16 have been formed is threaded over the eyelet shank 22 and moved therealong until the outer electrode 14 is in engagement with the flange 20. Various methods of forming the electrodes 14, 16 on the capacitor body are well-known in the art and will not be described in detail herein. The resilient insulator 30 is threaded onto the shank 22 until it rests against the ceramic disc. The loose assembly is then subjected to longitudinally applied stresses by the application of a properly shaped die member (not shown) to the end of the eyelet 18. This forms the secondary flange 32 on the eyelet and compresses the resilient bead 30. Subsequently, the assembled capacitor is removed from the die set and then is subjected to a sequence of fluxing and soldering operations to provide a solder connection between the flange 20 of the eyelet and the outer electrode 14. In addition to solder coating the inner electrode the entire feed-through capacitor is then coated with a thin layer of wax to provide handling projection for the unit before it is installed by the end user. This wax coating is effectively removed during the soldering of the capacitor to the conductive panel. However, no adverse effects due to humidity have been noted even though the feed-through capacitor is exposed to a high humidity ambient since the elements forming the capacitor are non-porous, that is, the ceramic disc, silicone rubber bead and brass eyelet are not affected by moisture. Capacitors have been produced by the foregoing method in which the overall length of the capacitor measured along the eyelet was 0.150", the ceramic disc was 0.040" thick and had a diameter of $5/16$ of an inch. Such a capacitor was tested and found to have the following electrical characteristics:

Capacitance—.0015 mfd. min. @ 1 kc. and 25° C.
Temperature characteristic—Z5U
Voltage—Rated, 500 volts DC; withstanding, 1500 volts DC one minute
Insulation resistance—100,000 megohms min.
Dissipation factor—2½% max. @ 1 kc. and 25° C.
Attenuation—(At 25° C. and 50 ohm system per (Typical) MIL STD 220): 50 mc., 25 db; 100 mc., 30 db; 500 mc., 45 db. (No parallel resonance effects at frequencies up to 1000 mc.)
Life test—2×rated voltage @ 85° C. for 1000 hours Moisture—Will withstand 95% RH, 40° C. for 200 hours with rated voltage applied A particular advantage is obtained in those embodiments of the invention wherein the insulator 30, 30′, 30″ is in the form of a resilient bead. In such constructions the stresses on the disc during the staking operation in which the secondary eyelet flange is formed are largely absorbed by the bead. The compressed bead thereafter serves the additional function of providing compensation for the different coefficients of expansion of the constituent parts of the feed-through capacitor. This property is of importance during the soldering of the eyelet flange 22 to the outer electrode 14 and is of even greater importance during the soldering of the inner electrode 16 to the panel 36 since capacitors are secured to the conductive panel by being soldered down at 425° F. for approximately two minutes using a solder preform.

While several embodiments of the invention have been shown and described it will be recognized by those skilled in the art that variations and modifications may be made therein without departing from the spirit and scope of the invention.

What is claimed is:

1. A feed-through capacitor for mounting in a hole in a conductive panel, said capacitor having a central conductor which has a pair of spaced opposed shoulders and a shank portion therebetween, a high dielectric ceramic disc on said conductor, said disc having a pair of opposed electrodes thereon, one of said electrodes being in engagement with one of the shoulders on said conductor, the other electrode being margined to provide a nonconductive path from said conductor to said electrode, insulator means in firm engagement with said margined electrode and with the other shoulder of said conductor, said insulator means locating said capacitor in said mounting hole, said margined electrode extending beyond said insulator means for direct engagement with said panel adjacent said mounting hole.

2. A capacitor according to claim 1 wherein said central conductor is in the form of an eyelet.

3. A capacitor according to claim 1 wherein said central conductor is in the form of a pin having portions which extend beyond the shoulders formed thereon to provide oppositely disposed termination points.

4. A capacitor according to claim 1 wherein said insulator means is in the form of a phenolic bead.

5. A capacitor according to claim 1 wherein said insulator means is in the form of a resilient bead.

6. A capacitor according to claim 5 wherein said resilient insulator means is formed of silicone rubber which is in compression.

7. A feed-through filter for mounting in a hole in a conductive panel, said filter having a central conductor which has a pair of spaced opposed shoulders and a shank portion therebetween, a high dielectric ceramic disc on said conductor, said disc having a pair of opposed electrodes thereon, one of said electrodes being in engagement with one of the shoulders on said conductor, the other electrode being margined to provide a nonconductive path from said conductor to said electrode, a core member of high core loss ferrite on said shank, said member being in firm engagement with said margined electrode, a sleeve of insulation on said shank interposed between said shank and said ferrite member, a resilient insulating washer positioned between said ferrite member and the other shoulder of said conductor, said washer being in compression to thereby maintain said ferrite core member firmly against said disc, said ferrite core member and said resilient washer locating said filter in said mounting hole, said margined electrode extending beyond said insulator means for engagement with said panel adjacent said mounting hole.

8. A feed-through filter according to claim 7 wherein said central conductor is in the form of an eyelet.

9. A feed-through filter according to claim 7 wherein said central conductor is in the form of a pin having portions which extend beyond the shoulders thereon to provide oppositely disposed termination points.

References Cited

UNITED STATES PATENTS

| | | | |
|---|---|---|---|
| 2,983,855 | 5/1961 | Schlicke | 317—242 |
| 3,007,121 | 10/1961 | Schlicke | 333—79 |
| 2,973,490 | 2/1961 | Schlicke | 333—79 |
| 3,002,136 | 9/1961 | Garstang | 333—79 |
| 3,076,947 | 2/1963 | Davidson | 333—79 |

HERMAN KARL SAALBACH, *Primary Examiner.*

C. BARAFF, *Assistant Examiner.*

U.S. Cl. X.R.

317—242, 256; 333—81